Patented Jan. 7, 1936

2,026,548

UNITED STATES PATENT OFFICE 2,026,548

FREE CUTTING ALLOYS

Louis W. Kempf and Walter A. Dean, Cleveland, Ohio, assignors to Aluminum Company of America, Pittsburgh, Pa., a corporation of Pennsylvania No Drawing. Application September 18, 1933, Serial No. 689,887

2 Claims. (Cl. 75—1)

The invention relates to aluminum base alloys and is particularly concerned with alloys similar to the type known in the trade as "duralumin" or 17S alloys. An alloy of this nature contains from about 2.0 per cent to 7.0 per cent of copper, from about 0.2 per cent to 2.0 per cent of magnesium, from about 0.1 per cent to 1.0 per cent of manganese, the balance being substantially all aluminum. This alloy and others of approximately the same composition are particularly amenable to working processes such as rolling, forging, drawing, or extruding and when thus mechanically deformed and subsequently subjected to suitable thermal treatments are characterized by very desirable physical properties.

There is, however, an inherent drawback which somewhat curtails the use of the duralumin type alloy in some applications where the alloy could otherwise be used. Mechanical cutting operations such as boring, drilling, shaping, or lathe-cutting are successfully carried out only by using certain precautions which increase the expense of the operation and which occasionally necessitate the use of another alloy which may be machined more readily but which is otherwise not so desirable from the standpoint of physical properties. When alloys are difficult to machine this disadvantage becomes evident in many cases through rapid wear of the cutting tool edge which necessitates frequent resharpening. In such cases where machining is difficult, continual lubrication is required, the machined surface is rough and irregular, and the chip has a tendency to form continuous curls or spirals that may foul the tool or the operating parts of the machine. Such articles as screws, bolts or nuts which must be formed with accuracy and speed, known generally as "screw machine products", are formed from the above disclosed alloys only with considerable care and caution and the need is immediately apparent for an alloy of good working characteristics, outstanding physical properties, yet possessing favorable machining qualities so that articles of good surface appearance may be formed therefrom economically and successfully.

Accordingly, an object of the invention is the production of an aluminum base alloy containing from about 2.0 per cent to about 7.0 per cent of copper, from about 0.2 per cent to about 2.0 per cent of magnesium, and from about 0.1 per cent to about 1.0 per cent of manganese which may be readily and economically subjected to cutting operations.

A further object is the production of such an alloy whose mechanical properties in the preferred composition range are not essentially altered except for the aforesaid improvement in machining properties.

These objects we have effected by the addition of one or more of the metals of the class composed of lead, bismuth and thallium, comprising the heavy metallic elements of atomic weights between about 204 and 209 in the periodic table. For the purposes of our invention these elements may be referred to as "free machining" elements and are considered to be substantially equivalent in alloys of the class herein described by reason of the similarity in effect upon the machining qualities of said alloys.

We have discovered that such elements are effective in amounts between about 0.05 per cent to 10 per cent of bismuth, between about 0.1 per cent to 10 per cent of lead, and between about 0.05 per cent to 10 per cent of thallium for the purpose of very definitely improving the machining properties of the duralumin type alloys. This improvement is evidenced by the character of the chip removed by the cutting tool, namely, that it breaks up into fairly minute and unobjectionable particles; by the increase in cutting speed that is made possible; and by the smooth and pleasing appearance of the machined surface that is obtained.

The simultaneous presence of more than one of the disclosed "free machining" elements namely lead, bismuth, or tahallium, appears to be more advantageous than that of the same total amount of either of the elements used separately. For instance, the addition of 1.0 per cent of bismuth and 1.0 per cent of lead produces a more distinct improvement in machining characteristics than the addition of 2.0 per cent of bismuth or lead separately.

If the elements are added separately we prefer to use about 3.0 per cent of lead, bismuth or thallium. If used in combinations the following additions are very advantageous: (1) 1.0 per cent of lead and 1.0 per cent of bismuth; (2) 1.0 per cent of lead and 1.0 per cent of thallium; (3) 1.0 per cent of bismuth and 1.0 per cent of thallium; (4) 1.0 per cent of lead, 1.0 per cent of bismuth and 1.0 per cent of thallium.

As preferred alloys of the duralumin type embodying our invention we select (1) an aluminum base alloy containing about 4.0 per cent of copper, about 0.5 per cent of magnesium, about 0.5 per cent of manganese and about 3.0 per cent of bismuth; (2) an aluminum base alloy containing about 4.0 per cent of copper, about 0.5 per cent of magnesium, about 0.5 per cent of manganese and about 3.0 per cent of lead; (3) an aluminum base alloy containing about 4.0 per cent of copper, about 0.5 per cent of magnesium, about 0.5 per cent of manganese and about 3.0 per cent of thallium. If two or more of the elements lead, bismuth or thallium be used in conjunction the total amount should preferably be in the neighborhood of 2.5 per cent and should usually not exceed about 10 per cent.

The physical properties of the alloys herein disclosed are not greatly affected by the addition of the aforesaid free machining constituents in an amount up to about 3 or 4 per cent total. If the total amount of lead, bismuth and/or thallium exceeds about 4 per cent there becomes apparent a falling off in properties which is compensated for by a further increase in the ease of machining and there may be certain applications of the alloy wherein a compromise of this nature is desirable.

The lead, bismuth or thallium may most conveniently be added by introducing these constituents in solid form into a molten head of the aluminum base alloy since they melt at a temperature considerably below those customarily used in handling molten aluminum or its alloys in the foundry. If amounts in excess of about 1.5 per cent of the free machining elements are required to be incorporated in the casting the melt should be heated somewhat above the ordinary temperature and vigorously stirred to assure a thorough mixture of the alloying constituents. The method here referred to of adding heavy low melting metals to aluminum is more fully described in co-pending application, Serial No. 689,885, filed September 18, 1933, now Patent 1,959,029, granted May 15, 1934.

The term "aluminum" used herein and in the appended claims embraces the usual impurities found in aluminum ingot of commercial grade, or picked up in the course of the usual handling operations incident to ordinary melting practice.

The alloys herein disclosed may be subjected to the usual thermal treatments familiar to those skilled in the art for the purpose of improving or altering their physical characteristics.

We claim:
1. An aluminum base alloy containing from about 2.0 per cent to 7.0 per cent of copper, from about 0.2 to 2 per cent of magnesium, from about 0.1 to 1.0 per cent of manganese and about 1.0 per cent each of the free machining elements lead and bismuth, the balance being aluminum.
2. An aluminum base alloy containing from about 2 to about 7 per cent of copper, from about 0.2 to 2 per cent of magnesium, from about 0.1 to about 1 per cent of manganese, from about 0.1 to about 10 per cent of lead, and from about 0.05 to about 10 per cent of bismuth, the balance being aluminum.

LOUIS W. KEMPF.
WALTER A. DEAN.

CERTIFICATE OF CORRECTION.

Patent No. 2,026,548.                                January 7, 1936.

LOUIS W. KEMPF, ET AL.

It is hereby certified that error appears in the printed specification of the above numbered patent requiring correction as follows: Page 1, second column, line 15, for "qualities" read quality; line 32, for "tahallium" read thallium; page 2, first column, line 24, for "head" read heat; and that the said Letters Patent should be read with this correction therein that the same may conform to the record of the case in the Patent Office.

Signed and sealed this 25th day of February, A. D. 1936.

Leslie Frazer

Acting Commissioner of Patents.

(Seal)